US011808609B2

(12) United States Patent
Furberg

(10) Patent No.: US 11,808,609 B2
(45) Date of Patent: Nov. 7, 2023

(54) GAS CELL HOUSING MOLDING MOLD, METHOD FOR MANUFACTURING GAS CELL HOUSING, GAS CELL HOUSING FOR GAS SENSOR, AND GAS SENSOR INCLUDING SAME

(71) Applicant: ASAHI KASEI MICRODEVICES CORPORATION, Tokyo (JP)

(72) Inventor: Lars Furberg, Delsbo (SE)

(73) Assignee: Asahi Kasei Microdevices Corporation, Tokyo (JP)

( * ) Notice: Subject to any disclaimer, the term of this patent is extended or adjusted under 35 U.S.C. 154(b) by 299 days.

(21) Appl. No.: 17/386,625

(22) Filed: Jul. 28, 2021

(65) Prior Publication Data
US 2022/0042831 A1 Feb. 10, 2022

(30) Foreign Application Priority Data

Aug. 4, 2020 (JP) ................................. 2020-132601
Jun. 30, 2021 (JP) ................................. 2021-108739

(51) Int. Cl.
*B29C 45/44* (2006.01)
*G01D 11/24* (2006.01)
*B29C 45/14* (2006.01)
*B29L 31/00* (2006.01)

(52) U.S. Cl.
CPC ....... *G01D 11/245* (2013.01); *B29C 45/14639* (2013.01); *B29C 45/44* (2013.01); *B29C 2045/4492* (2013.01); *B29L 2031/752* (2013.01)

(58) Field of Classification Search
CPC .................. G01D 11/245; B29C 45/44; B29C 2045/4492; B29C 45/14639
See application file for complete search history.

(56) References Cited

U.S. PATENT DOCUMENTS

2015/0377775 A1* 12/2015 Sakai ................. G01N 21/0303
250/338.1

FOREIGN PATENT DOCUMENTS

JP 2017-015567 A 1/2017

* cited by examiner

*Primary Examiner* — Jamel E Williams
(74) *Attorney, Agent, or Firm* — Morgan, Lewis & Bockius LLP

(57) ABSTRACT

A gas sensor includes, in a single housing section, a substrate mounting surface 31 mounted with a substrate including a light emitter and a light receiver and a mirror section including plural reflectors. Then, in the housing section, all of the plural reflectors are integrally molded on an inner surface of the housing section to multiple reflect light emitted from the light emitter and cause the light to enter the light receiver in an opposing direction of one side and the other side in an extension direction of the substrate mounting surface.

6 Claims, 5 Drawing Sheets

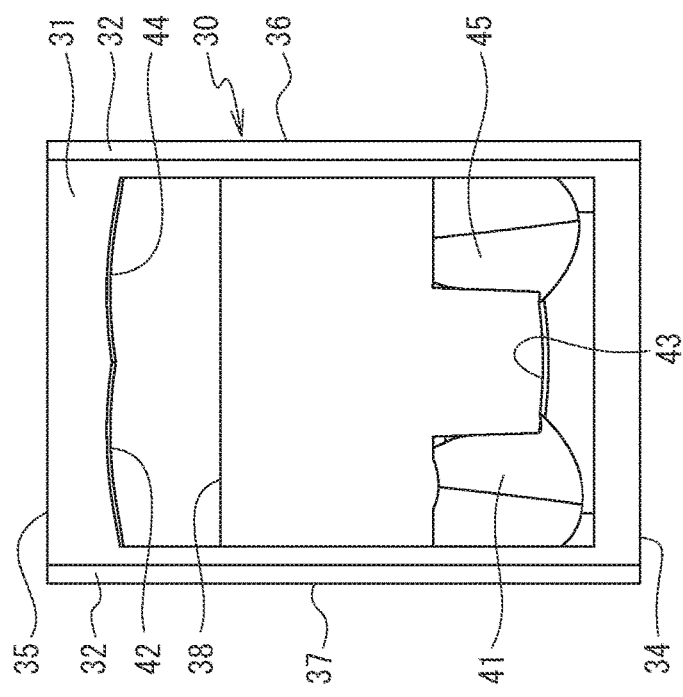
FIG. 4A
FIG. 4B
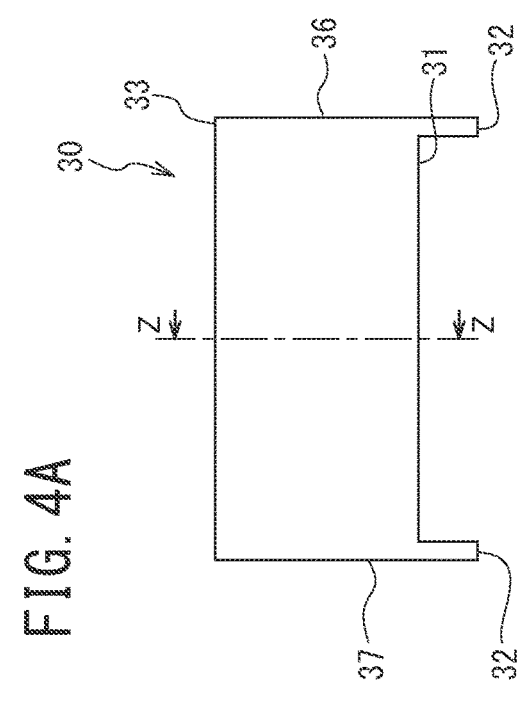
FIG. 4C
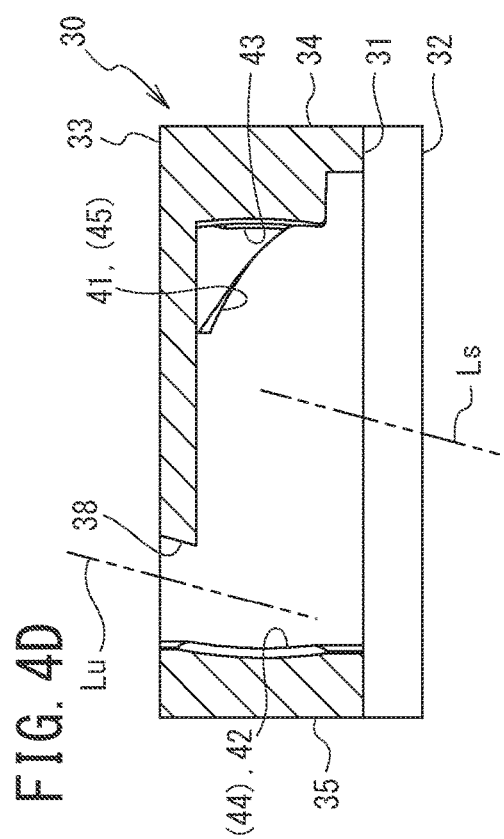
FIG. 4D

GAS CELL HOUSING MOLDING MOLD, METHOD FOR MANUFACTURING GAS CELL HOUSING, GAS CELL HOUSING FOR GAS SENSOR, AND GAS SENSOR INCLUDING SAME

TECHNICAL FIELD

The present invention relates to a gas sensor, and in particular to a gas cell housing molding mold, a method for manufacturing a gas cell housing, a gas cell housing for a gas sensor, and a gas sensor including the same.

BACKGROUND ART

As gas concentration measuring apparatuses for measuring the concentration of a gas to be measured in the atmosphere, non-dispersive infrared type gas sensors are conventionally known. Those sensors measure gas concentration by utilizing the fact that the wavelength of infrared light absorbed varies depending on the type of gas and detecting the amount of the infrared absorption.

For example, PTL 1 discloses a gas sensor including a gas cell (OBA) that includes a light emitter, a light receiver, and mirror sections.

In a technology described in the above literature, the light emitter and the light receiver are arranged at focal points of the mirror sections provided corresponding to the light emitter and the light receiver, respectively, and light emitted from the light emitter is caused to enter the light receiver via the mirror sections. In this case, a gas to be measured is introduced into the gas cell to detect the concentration of the gas to be measured in response to an output signal of the light receiver.

CITATION LIST

Patent Literature

PTL 1: JP 2017-15567 A

SUMMARY OF INVENTION

Technical Problem

Here, in the gas cell included in this type of gas sensor, the mirror sections provided in a housing of the gas cell require optimization of an optical path folded back in multiple stages in order to acquire a highly accurate detection signal to achieve a high SN ratio. For example, a gas cell designed for a low concentration gas obtains along optical path length by using multiple reflection inside the housing of the gas cell.

In order to obtain a mirror section having excellent reflective characteristics, it is desirable to use a gas cell that includes mirror surfaces having high reflectance and aging characteristics resistant to atmospheric environment including climate and air pollution. Therefore, a mold for resin molding the housing section and mirror section of a gas cell is precisely designed with extremely high accuracy on the basis of in-depth knowledge of optical physics and, for example, optical path simulation based on Lambert-Beer's Law.

However, the housing structure of the conventional gas cell is formed by a plurality of components in which the housing section and the mirror sections are prepared as separate components. Therefore, since the housing section and the mirror sections of the gas cell are separate components, there is a problem where it is difficult to obtain high robustness of a multiple reflection optical path formed by mirror surfaces of the mirror sections and folded back in multiple stages.

In addition, for example, for current 3D printing technology, it is extremely difficult to highly accurately form, integrally with a housing section in a gas cell housing, surface roughness required for mirror surfaces forming the multiple reflection optical path of a mirror section and an optical system that folds light back in multiple stages.

Accordingly, the present invention has been made in view of such problems. It is an object of the present invention to provide a gas cell housing molding mold, a method for manufacturing a gas cell housing, a gas cell housing for a gas sensor, and a gas sensor including the same that eliminate the need for incorporation of a mirror section in the housing section of a gas cell and simplify the step of adjusting assembly tolerance of the sensitive optical component to achieve high robustness of a multiple reflection optical path folded back in multiple stages.

Solution to Problem

To achieve the object, a gas cell housing molding mold according to one aspect of the present invention is a gas cell housing molding mold for injection molding, with resin material, a gas cell housing including a mirror section including a plurality of reflectors arranged to multiple reflect light emitted from a light emitter and cause the light to enter alight receiver in an opposing direction of one side and an other side of a substrate mounting surface with respect to the substrate mounting surface mounted with a substrate including the light emitter and the light receiver, the gas cell housing molding mold being configured to integrally mold all of the plurality of reflectors on an inner surface of the single gas cell housing to be molded by setting mutual pull-out directions of a lower mold and an upper mold during mold release obliquely with respect to a direction perpendicular to an extension direction of the substrate mounting surface so that all of the plurality of reflectors have no undercut shape.

Additionally, to achieve the object, a method for manufacturing a gas cell housing according to one aspect of the present invention uses the gas cell housing molding mold according to the one aspect of the present invention to mold by setting the mutual pull-out directions of the lower and upper molds during mold release obliquely with respect to the direction perpendicular to the extension direction of the substrate mounting surface so that all of the plurality of reflectors have no undercuts and by inserting and pulling out the lower and upper molds and integrally mold all of the plurality of reflectors with an inner surface of the single housing section to manufacture the gas cell housing.

Furthermore, to achieve the object, a gas cell housing for a gas sensor according to one aspect of the present invention is a gas cell housing for a gas sensor including, in a single housing section, a substrate mounting surface mounted with a substrate including a light emitter and a light receiver and a mirror section including a plurality of reflectors, in which in the housing section, all of the plurality of reflectors are integrally molded on an inner surface of the housing section to multiple reflect light emitted from the light emitter and cause the light to enter the light receiver in an opposing direction of one side and an other side the substrate mounting surface.

Still furthermore, to achieve the object, a gas sensor according to one aspect of the present invention includes the gas cell housing for a gas sensor according to the one aspect of the present invention.

According to the present invention, in the mirror section of the gas sensor according to the present invention, all of the plurality of reflectors are integrally molded on the inner surface of the gas cell housing. This eliminates the need for a step of incorporating the mirror section in the gas cell housing, and can simplify a step of adjusting assembly tolerance of the sensitive optical component. Thus, there can be obtained high robustness of the multiple reflection optical path folded back in multiple stages.

Advantageous Effects of Invention

As described above, according to the present invention, the step of incorporating the mirror section in the gas cell housing is unnecessary, and the step of adjusting the assembly tolerance of the sensitive optical component can be simplified. Therefore, high robustness of the multiple reflection optical path folded back in multiple stages can be obtained.

BRIEF DESCRIPTION OF DRAWINGS

FIGS. 2A to 2D are illustrations of the one embodiment of the gas sensor according to the one aspect of the present invention, in which FIG. 2A is a front view, FIG. 2B is a bottom view, FIG. 2C is a sectional view taken along line X-X of FIG. 2A, and FIG. 2D is a sectional view taken along line Y-Y of FIG. 2B;

FIGS. 3A and 3B are illustrations of one embodiment of a gas cell housing forming the gas sensor according to the one aspect of the present invention, in which FIG. 3A is a perspective view as seen from the front, the right side, and above in a plan view direction, and FIG. 3B is a perspective view as seen from the front, the left side, and below in a bottom view direction;

FIGS. 4A to 4D are illustrations of the one embodiment of the gas cell housing forming the gas sensor according to the one aspect of the present invention, in which FIG. 4A is a front view, FIG. 4B is a bottom view, FIG. 4C is a left side view in which a main configuration portion inside the housing is illustrated in dashed lines, and FIG. 4D is a sectional view taken along line Z-Z of FIG. 4A.

DESCRIPTION OF EMBODIMENTS

Figure 1A:
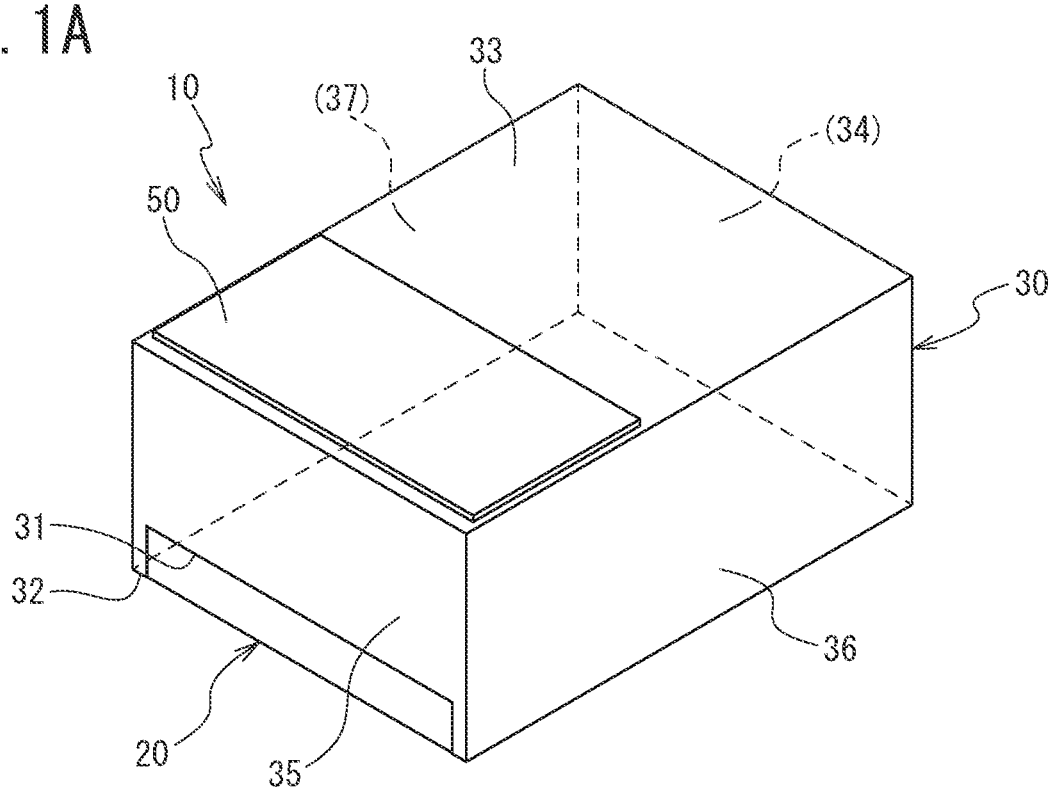
FIGS. 1A and 1B are perspective views illustrating one embodiment of a gas sensor according to one aspect of the present invention, FIG. 1B illustrating a main configuration portion inside the housing of a gas cell.

Hereinafter, an embodiment of the present invention will be described with appropriate reference to the drawings. It should be noted that the drawings are schematic, and therefore, relationships and ratios between thicknesses and planar dimensions, and the like are different from actual ones, and the dimensional relationships and ratios are partially different from each other among the drawings.

Additionally, the following embodiment exemplifies devices and methods for embodying the technological ideas of the present invention, and the technological ideas of the invention is not limited to the materials, shapes, structures, arrangements, and the like of the constituent components to the embodiments below.

As illustrated in FIGS. 1A, 1B, and 2A to 2D, a gas sensor 10 according to the present embodiment includes a gas cell housing 30 having a rectangular-parallelepiped appearance and a substrate 20 having a rectangular-parallelepiped plate shape mounted on a bottom surface side of the gas cell housing 30.

Additionally, for convenience of description, the present specification assumes that a longitudinal direction of the rectangular parallelepiped shape is front and back, and a traverse direction thereof is left and right. In the front and back of the longitudinal direction of the gas cell housing 30, a wall surface on a front side in the drawing is referred to as a front wall surface 35. In the same way, a far side in the longitudinal direction is referred to as a back wall surface 34, a right side in the traverse direction as a right wall surface 36, a left side in the traverse direction as a left wall surface 37, a surface on an upper side as a top surface 33, and a surface on a lower side as a bottom surface 32.

Figure 1B:
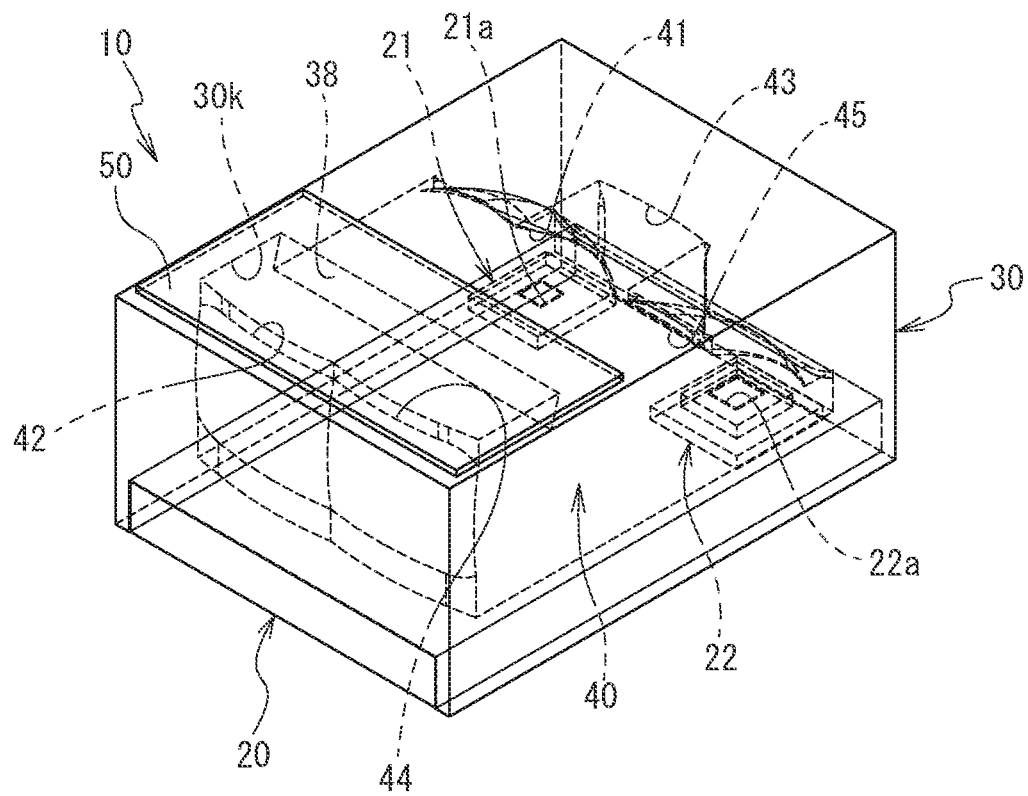
Figure 2A:
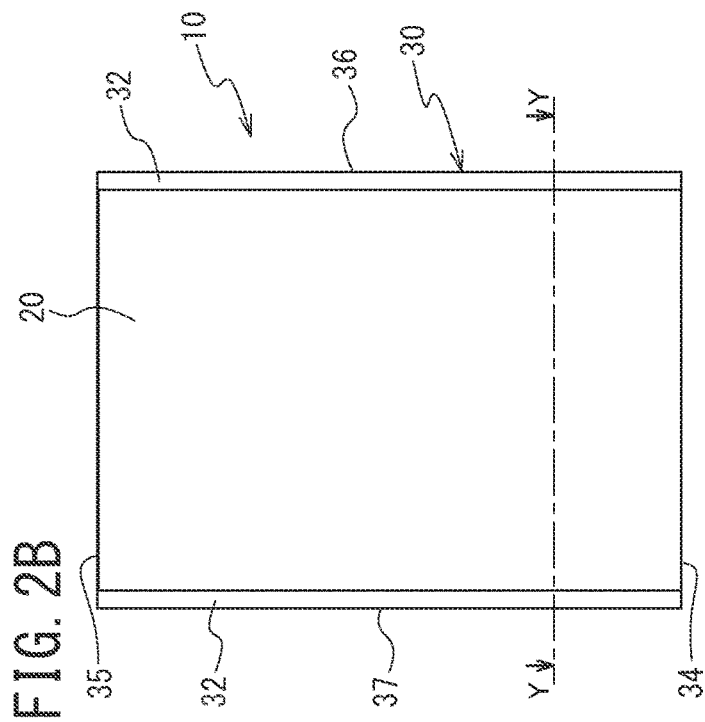
Figure 2B:
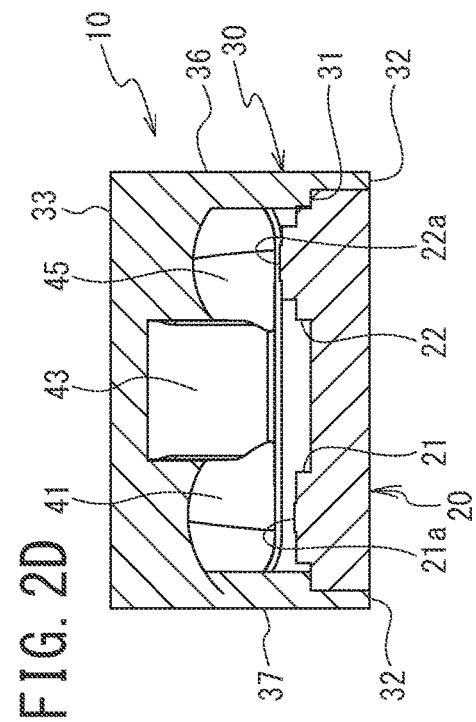
Figure 2C:
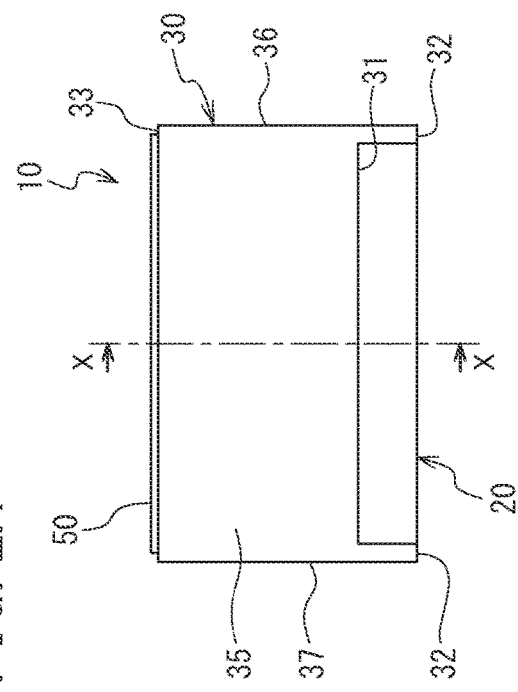
Figure 2D:
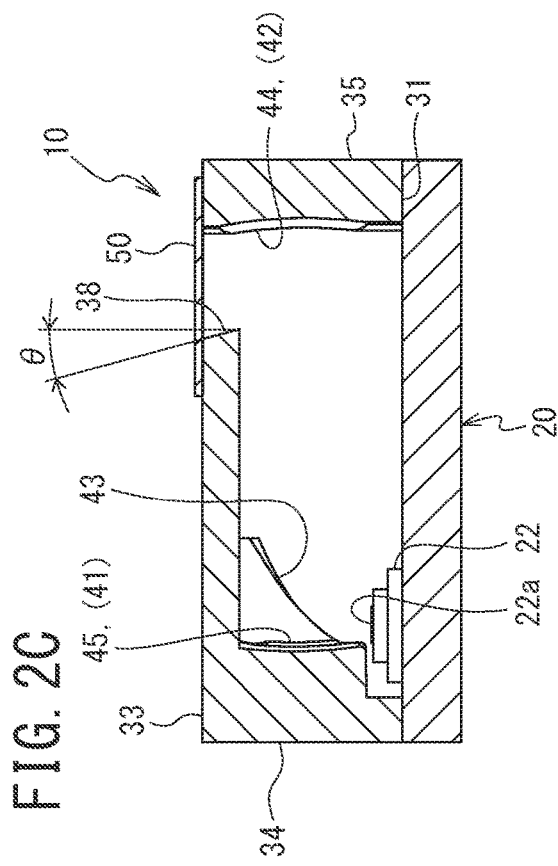
Figure 3A:
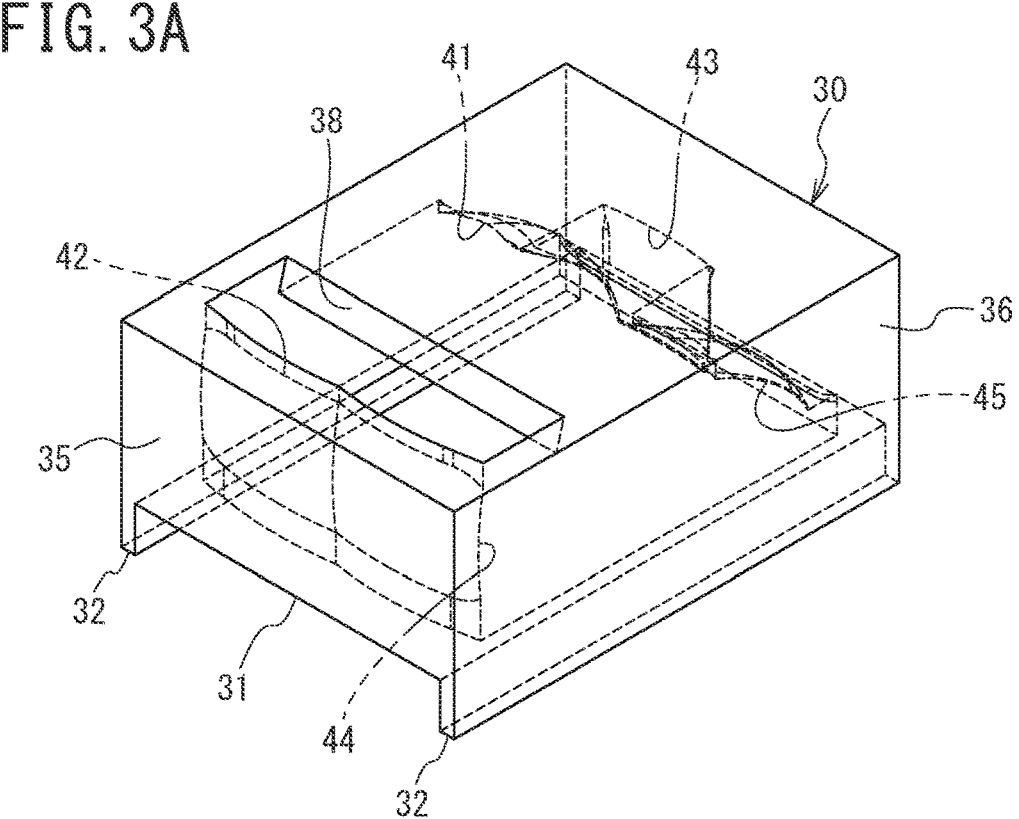
Figure 3B:
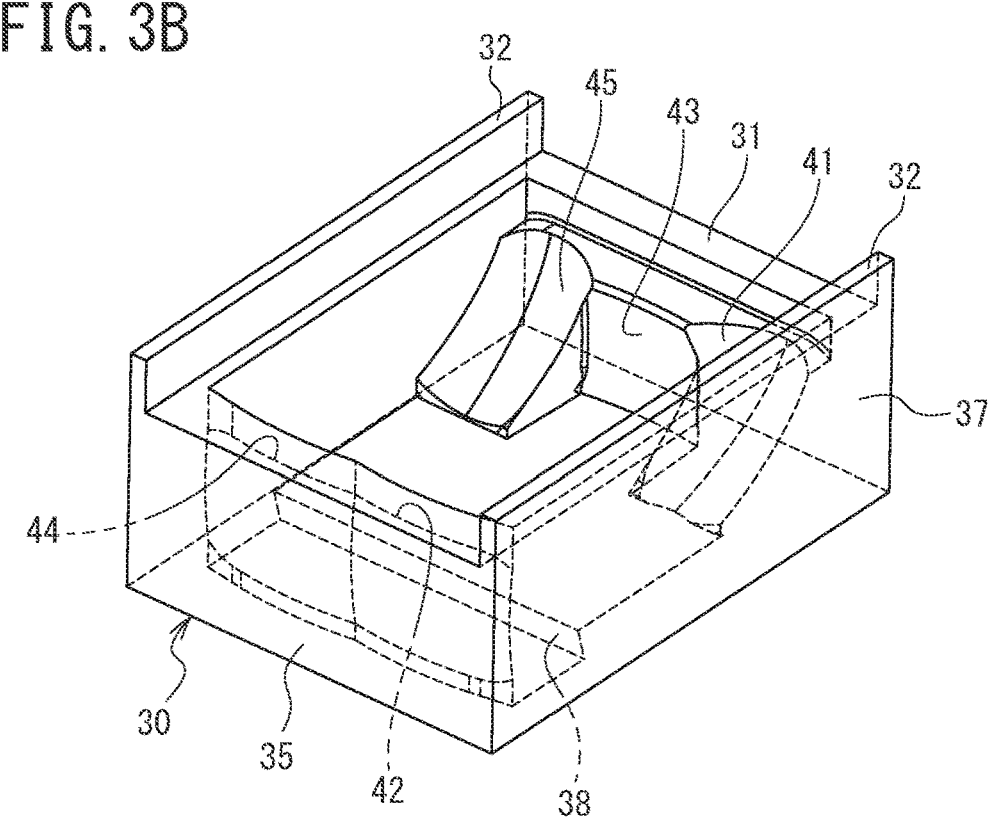

In the gas sensor 10, a cavity is formed inside the gas cell housing 30. As illustrated in FIG. 1B and FIGS. 2C and 2D, a mirror section 40 including a plurality of reflectors 41 to 45 is provided on an inner surface of the gas cell housing 30.

At the bottom surface 32 of the gas cell housing 30, a recessed portion largely opening downward except for both sides of the longitudinal direction is formed as a substrate mounting surface 31, and the substrate 20 having the rectangular-parallelepiped plate shape is mounted on the substrate mounting surface 31 so as to be fitted into the recessed portion. In this case, the substrate 20 is mounted so that a light emitter 21 and a light receiver 22 are located on one side of the front and back direction.

As illustrated in FIGS. 3A, 3B and 4A to 4D, in the gas cell housing 30 of the present embodiment, all of the plurality of reflectors 41 to 45 are integrally molded on the inner surface of the gas cell housing 30 to multiple reflect light emitted from the light emitter 21 in an opposing direction of one side and the other side of an extension direction of the substrate mounting surface 31 and cause the reflected light to enter the light receiver 22.

In the example of the present embodiment, two reflectors 42 and 44 are arranged on a side opposite to the side where the light emitter 21 and the light receiver 22 are located, and a rectangle-shaped opening portion 30k is formed to be located above the two reflectors 42 and 44.

In the gas sensor 10 of the present embodiment, the opening portion 30k opening thereabove is used as an inlet/outlet for a gas to be measured, and the gas to be measured is introduced in the gas cell housing 30 from the opening portion 30k via a particle filter 50.

Then, the gas sensor 10 of the present embodiment is configured to allow the gas to be measured to pass between the light emitter 21 and the light receiver 22 and the mirror section 40 and, on the basis of an output signal of the light receiver 22 at that time, allow the concentration of the gas to be measured to be calculated by a concentration calculation unit (not illustrated).

As a result, the gas sensor 10 is configured to, on the basis of the output signal of the light receiver 22 obtained by the concentration calculation unit, to allow for calculation of the concentration of the gas to be measured in an optical path from the light emitter 21 to the light receiver 22, so as to serve as a gas concentration measurement device.

Note that shapes of a light receiving surface 22a and a light emitting surface 21a are not limited to rectangles, and can be any shapes. For example, one of the light receiving surface 22a or the light emitting surface 21a may be oval.

More specifically, as illustrated in FIGS. 1A, 1B and 2A to 2D, the gas sensor 10 according to the present embodiment includes the two opening portions formed at the top and bottom of the gas cell housing 30, and the two opening portions are connected to the plurality of reflectors 41 to 45 formed on the inner surface of the gas cell housing 30 to define the internal cavity.

The opening portion 30k at the top is sealed from an upper surface by the particle filter 50 to cover the opening portion 30k. The particle filter 50 is formed into a rectangular plate shape that is slightly larger than the opening portion 30k, and attached to cover the opening portion 30k.

The opening portion at the bottom is the substrate mounting surface 31, to which the substrate 20 having a similar shape is mounted to cover the opening portion. As illustrated in FIG. 1B and FIG. 2D, the substrate 20 is provided with the light emitter 21 and the light receiver 22, and the inner surface of the gas cell housing 30 is provided with the mirror section 40. In this example, the light emitter 21 and the light receiver 22 are arranged on the single substrate 20.

The substrate 20 is a circuit board that also serves as a base board, and for example, a printed circuit board can be used. Note that the light emitter 21 and the light receiver 22 are not limited to being mounted on the same substrate 20, and may be mounted in separated substrates.

The light emitter 21 includes the light emitting surface 21a and is configured to be capable of emitting light containing infrared light. The light emitter 21 is placed at a position where light applied from the light emitting surface 21a is multiple reflected by the plurality of reflectors 41 to 45 of the mirror section 40 and a focal point of the mirror section 40 overlaps the light receiving surface 22a of the light receiver 22.

The light emitter 21 is not particularly limited as long as it outputs light containing wavelengths absorbed by the gas to be measured. Specific examples thereof include microelectromechanical systems (MEMS) light sources and light emitting diodes. Among them, preferred are those that output only light of a wavelength band largely absorbed by the gas to be measured from the viewpoint of reduction of noise due to light absorption by components other than the gas to be measured.

Specifically, from the viewpoint of being capable of controlling a light emission wavelength band by the band gap of an active layer, the light emitter 21 may preferably have a structure of a light emitting diode. The light emitting diode may be formed on a semiconductor substrate.

In addition, it is also preferable that the light emitters 21 are connected in series or in parallel by wiring in order to increase light emission intensity. Furthermore, a sensor unit for monitoring the amount of light emission may be provided at a position where light emitted from the light emitting diode and reflected by a back surface of the semiconductor substrate enters.

The light emitter 21 may further include an optical filter having desired optical characteristics according to the gas to be measured. For example, when the gas to be measured is carbon dioxide, there is exemplified one embodiment in which the light emitter 21 is mounted with a band pass filter capable of filtering infrared light of a wavelength band (typically, around 4.3 μm) where a large amount of infrared absorption by carbon dioxide occurs.

The light receiver 22 includes the light receiving surface 22a, and is configured to be capable of receiving at least a part of light emitted from the light emitter 21. The light receiver 22 is placed at a position where the light receiving surface 22a overlaps a focal point of the mirror section 40.

Preferably, the light receiver 22 may be a photodiode. The photodiode may preferably have sensitivity to the band of light containing wavelengths absorbed by the gas to be measured. The shape of the photodiode is not particularly limited as long as a sufficient S/N ratio can be obtained.

The photodiode may further include an optical filter having desired optical characteristics according to the gas to be measured. For example, when the gas to be measured is carbon dioxide, there is exemplified one embodiment in which the photodiode is mounted with a band pass filter capable of filtering infrared light of a wavelength band (typically, around 4.3 μm) where a large amount of infrared absorption by carbon dioxide occurs.

As illustrated in FIGS. 3A, 3B and 4A to 4D described above, the mirror section 40 includes the plurality of reflectors 41 to 45, and is configured so that the plurality of reflectors 41 to 45 are arranged to multiple reflect light emitted from the light emitter 21 to the light receiver 22 to form a multi-stage reflection optical path.

Additionally, the multi-stage reflection optical path is formed so that the mirror section 40 can focus light emitted from the light emitting surface 21a of the light emitter 21 and can focus light directed toward the light receiving surface 22a of the light receiver 22. The mirror section 40 according to the present embodiment multiple reflects the light emitted from the light emitter 21 so that the focal point is located at the position overlapping the light receiving surface 22a of the light receiver 22.

As a result, the gas sensor 10 of the present embodiment is a realization of a gas sensor that achieves a long optical path length while including the gas cell housing 30 small and compact in configuration, thus enabling improved accuracy of detection of gas concentration.

In the present embodiment, all of the plurality of reflectors 41 to 45 are integrally molded with resin base material on the inner surface of the gas cell housing 30 having a specific shape, and then, light reflecting portions are deposited or plated with an alloy containing aluminum, gold, and silver, these metal laminates, or the like to form reflecting surfaces.

Note that the focal point is a position uniquely determined by a relative positional relationship between the light emitter 21, the light receiver 22, and the mirror section 40 and the shapes and arrangement of the plurality of reflectors 41 to 45. The types of reflectors having the focal point include spherical mirrors, elliptical mirrors, parabolic mirrors, and the like. When using spherical mirrors or parabolic mirrors to convert light to parallel light, a plane mirror may be further provided between two spherical mirrors or parabolic mirrors in order to obtain a long optical path length.

Here, the gas cell housing 30 of the gas sensor 10 according to the present embodiment is molded by a mold (see FIG. 5) that is configured so that pull-out directions Lu and Ls during mold release satisfy conditions for achieving a predetermined integrated structure including the mirror section 40, particularly, as illustrated in FIG. 4D, and that thereby allows all of the plurality of reflectors 41 to 45 forming the mirror section 40 to be integrally molded on the inner surface of the single housing 30, as will be described later.

Therefore, according to the gas sensor 10 according to the present embodiment, since all of the plurality of reflectors 41 to 45 forming the mirror section 40 are integrally molded on the inner surface of the single housing 30, changes in the output signal of the light receiver 22 due to effect of expansion and contraction of an adhesive or the like can be suppressed. As a result, most of the light multiple reflected by the mirror section 40 can be accurately received by the light receiving surface 22a of the light receiver 22.

The gas cell housing 30 of the gas sensor 10 according to the present embodiment is molded by a gas cell housing molding mold that will be described later. Thus, the gas cell housing 30 has an undercut shape in a direction perpendicular to the extension direction of the substrate mounting surface 31 to be molded. On the other hand, the gas cell housing 30 does not have any undercut shape in a direction inclined by a specific angle with respect to the extension direction of the substrate mounting surface 31 to be molded.

In this way, in the gas cell housing 30, the reflectors 41 to 45 and the like are integrally molded while having an undercut shape in the direction perpendicular to the extension direction of the substrate mounting surface 31 to be molded. Accordingly, there is no possibility of expansion and contraction of an resin adhesive due to an external environmental factor or misalignment of an incorporation position of the mirror section 40, as well as the mirror shape is almost unrestricted, therefore achieving high robustness and enabling highly accurate and stable detection of gas concentration.

<Gas Cell Housing Molding Mold and Method for Manufacturing Gas Cell Housing Using the Same>

Hereinafter, a description will be given of the gas cell housing molding mold of the present embodiment and a method for manufacturing a gas cell housing using the mold. The gas cell housing 30 of the present embodiment is molded by a dedicated gas cell housing molding mold, for example, as illustrated in a schematic view of FIG. 5.

The gas cell housing molding mold of the present embodiment employs a contrivance to set a pull-out direction Lu of an upper mold 100 and a pull-out direction Ls of a lower mold 200 to predetermined directions and a shutoff in which mutually contacting surfaces (including parting surfaces) of the lower mold 200 on a fixed side and the upper mold 100 on a movable side are rubbed against each other to make them contact closely.

Figure 5:
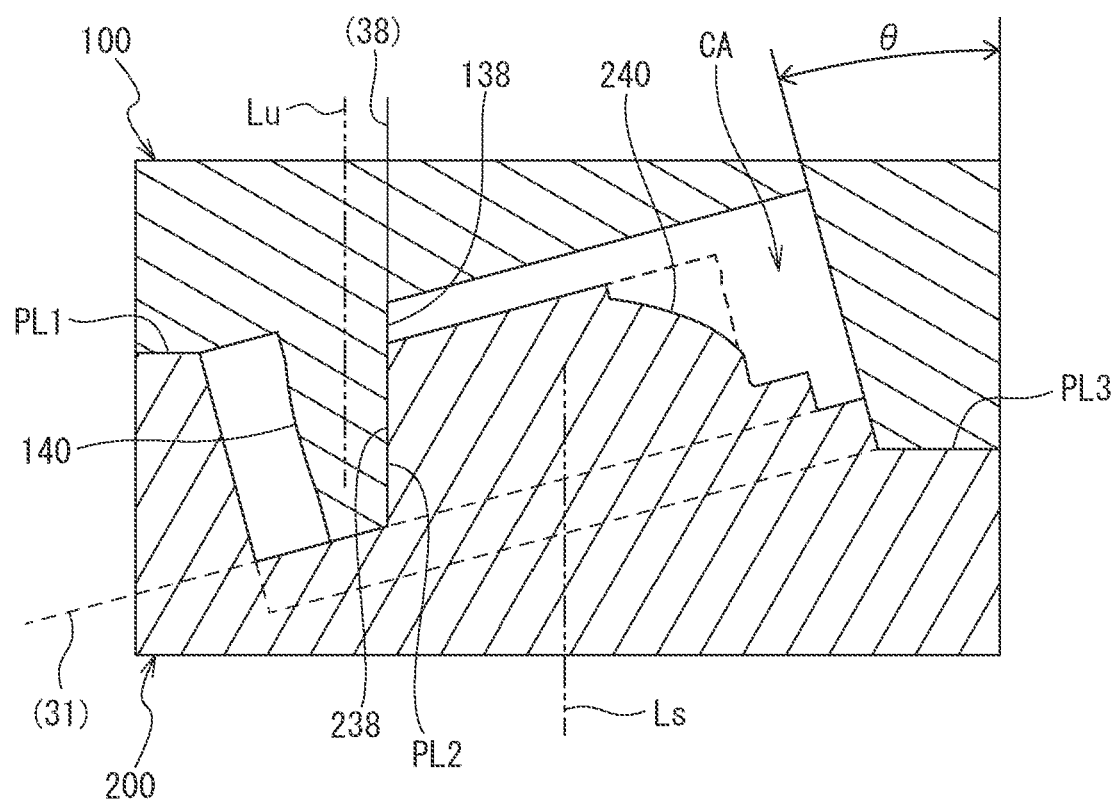
FIG. 5 is an illustration of a gas cell housing molding mold for manufacturing a gas cell housing according to one aspect of the present invention, which illustration schematically illustrates a sectional shape corresponding to a sectional portion illustrated in FIG. 4D.

Specifically, as illustrated in FIG. 5, the molding mold for the gas cell housing 30 according to the present embodiment includes at least the lower mold 200 and the upper mold 100. The mutual pull-out directions Lu and Ls during mold release are provided relatively obliquely (angle θ) with respect to the direction perpendicular to the extension direction of the substrate mounting surface 31 to be molded so that all of the plurality of reflectors 41 to 45 have no undercut shape. Here, the angle θ is preferably from 5° to 85° or from −5° to −85°, and more preferably from 10° to 80° or from −10° to −80°.

This allows the gas cell housing molding mold to integrally mold all of the plurality of reflectors 41 to 45 on the inner surface of the single gas cell housing 30 to be molded so that they have no undercut shape. Additionally, when the pull-out directions Lu and Ls of the molding mold for the gas cell housing 30 during mold release are perpendicular to the extension direction of the substrate mounting surface 31 to be molded, the gas cell housing 30 according to the present embodiment has a shape with an undercut shape, which is therefore a shape that does not allow integral molding by a two-part straight-pull mold.

In addition, a cavity forming portion CA illustrated in the drawing is a cavity according to a molded shape illustrated in FIGS. 3A, 3B and 4A to 4D. In order to from the cavity according to the mold shape, the lower mold 200 is formed with a cavity forming protrusion portion 240 protruding upward, and the upper mold 100 is formed with a cavity forming protrusion portion 140 protruding downward.

In the example of the drawing, mutual butting surfaces PL1 and PL3 of the lower mold 200 and the upper mold 100 are orthogonal to the pull-out directions Lu and Ls during mold release, and the pull-out directions Lu and Ls during mold release are a vertical direction. Then, in the gas cell housing molding mold, the pull-out directions Lu and Ls during mold release are provided relatively obliquely (angle θ) with respect to the direction perpendicular to the extension direction of the substrate mounting surface 31 to be molded. Therefore, as illustrated in FIG. 2C, an inner inclined surface 38 of the opening portion 30k at the top is formed by a shutoff surface PL2 along the pull-out directions Lu and Ls during mold release.

In other words, the inner inclined surface 38 is formed into a shape along mutual sliding contact surfaces 138 and 238 of the cavity forming protrusion portion 240 of the lower mold 200 and the cavity forming protrusion portion 140 of the upper mold 100, which form the shutoff surface PL2, and is an inclined surface corresponding to the oblique angle (angle θ) of the pull-out directions Lu and Ls during mold release.

In short, the shutoff surface PL2 is parallel to the pull-out directions Lu and Ls during mold release. Even when an undercut shape is formed if a protrusion portion is provided on only either one of the upper mold 100 or the lower mold 200, mutual pulling out of the upper mold 100 and the lower mold 200 can be performed by dividing the protrusion portion into the cavity forming protrusion portions 240 and 140 so that no undercut shape is formed and making the shutoff surface PL2 between the cavity forming protrusion portions 240 and 140 parallel to the pull-out directions Lu and Ls during mold release.

In a method for manufacturing the gas cell housing 30 by the gas cell housing molding mold according to the present embodiment, the above-described gas cell housing 30 is injection molded with resin material by an unillustrated injection molding machine. In the gas cell housing 30 according to the present embodiment, the mirror section 40 is integrally molded with a single material such as resin (made of PPS) on the inner surface of the single housing section 30.

In the gas cell housing molding mold according to the present embodiment, molding is performed by setting the above-described mutual pull-out directions Lu and Ls of the upper and lower molds 100 and 200 during mold release obliquely (angle θ) with respect to the direction perpendicular to the extension direction of the substrate mounting surface 31 so that no undercuts are formed on the reflecting surfaces of the plurality of reflectors 41 to 45 and by inserting and pulling out the upper and lower molds 100 and 200.

In this way, the method for manufacturing the gas cell housing 30 by the gas cell housing molding mold according to the present embodiment allows the mirror section 40 to be integrally molded on the inner surface of the gas cell housing 30 by the two-part straight-pull mold without using a core or a hand-loaded insert. Additionally, in the present embodiment, no bumpoff occurs on all of the plurality of reflectors 41 to 45 of the mirror section 40, as well as no draft angle is needed for all outer surfaces of the rectangular-parallelepiped gas cell housing 30. As a result, the design of the mold is simplified, which can reduce product cost. In addition, problems of thermal expansion coefficient, humidity expansion coefficient, and the like due to mixing of different materials are reduced.

Thus, the gas cell housing molding mold and the method for manufacturing the gas cell housing 30 by the same according to the present embodiment can realize the gas sensor 10 having high robustness and capable of highly accurately detecting gas concentration. In other words, integrally molding the mirror section 40 on the inner surface of the gas cell housing 30 allows for suppression of changes in the output signal of the light receiver 22 due to the effect of expansion and contraction of an adhesive or the like.

Accordingly, the gas cell housing molding mold and the method for manufacturing the gas cell housing 30 by the same according to the present embodiment would enable efficient and inexpensive manufacturing of the gas cell housing 30 formed by integrally molding all of the plurality of reflectors 41 to 45 on the inner surface of the single housing section.

Then, in the gas cell housing 30 including the mirror section 40 integrally provided on the inner surface thereof, the substrate 20 is fixed with a resin adhesive at the position of the substrate mounting surface 31 of the gas cell housing 30 to cover the entire opening portion, thereby completing the gas sensor 10 according to the present embodiment.

As a result, the mirror section 40 integrally molded on the gas cell housing 30 allows a larger amount of light emitted from the light emitter 21 to be received by the plurality of reflectors 41 to 45, and allows the larger amount of light reflected by the plurality of reflectors 41 to 45 to enter the light receiver 22.

<Functions and Effects>

Next, a description will be given of functions and effects of the gas cell housing 30, the gas sensor 10 including the same, the molding mold for the gas cell housing 30, and the method for manufacturing the gas cell housing 30 according to the present embodiment.

Here, this type of gas cell housing has conventionally been formed by incorporating, for example, two mirror sections, which consist of separate components from a housing section, inside the single housing section and fixing them using a resin adhesive. Conventionally, for example, a housing section made of liquid crystal polymer (LCP) and mirror sections formed of resin plates (made of PPS) have been integrated together by an adhesive or thermal caulking.

However, when the mirror sections consisting of separate components are fixed with a resin adhesive to the inside of the housing section of the gas cell housing, expansion and contraction of the adhesive due to an external environmental factor may cause misalignment of the mirror sections with respect to the light emitter and the light receiver of the substrate fixed on the housing section side.

The occurrence of such a misalignment may change the output signal of the light receiver in spite of unchanged gas concentration of a gas to be measured, which can interfere with highly accurate detection of gas concentration.

On the other hand, according to the gas sensor 10 of the present embodiment, using the above-described gas cell housing molding mold, molding is performed by inserting and pulling out the upper and lower molds 100 and 200 with the angle θ that is oblique with respect to the direction perpendicular to the extension direction of the substrate mounting surface 31 so that no undercut like a bumpoff occurs on all of the plurality of reflectors 41 to 45 to manufacture the gas cell housing 30 including the plurality of reflectors 41 to 45 integrally molded on the inner surface of the single housing section. Accordingly, the mirror section 40 without the occurrence of any undercuts on all of the plurality of reflectors 41 to 45 can be integrally molded on the inner surface of the gas cell housing 30.

Therefore, according to the gas sensor 10 of the present embodiment, the integrated structure in which all of the plurality of reflectors 41 to 45 of the mirror section 40 are integrally molded on the single housing 30 eliminates the need for the conventional steps of incorporating and bonding two mirror sections (mirror assemblies) inside the housing section of the gas cell housing 30, thereby enabling simplification of the step of adjusting assembly tolerance of the sensitive optical component.

Additionally, in the mirror section 40 of the gas cell housing 30 of the present embodiment, since all of the reflecting surfaces of the plurality of reflectors 41 to 45 are integrally molded on the single gas cell housing 30, there is no possibility of expansion and contraction of a resin adhesive due to an external environmental factor or misalignment of the incorporation position of the mirror section 40. Thus, high robustness is achieved, and gas concentration can be detected with stability and high accuracy.

Here, in order to allow light emitted from the light emitter 21 to enter the light receiver 22 without wasting it to increase the output signal of the light receiver 22, it is better for the mirror section 40 to focus the light into as small a range as possible toward the light receiving surface 22a of the light receiver 22.

By contrast, as in the present embodiment, when the plurality of reflectors 41 to 45 forming the mirror section 40 of the gas cell are integrally molded in the single gas cell housing 30, the light multiple reflecting surfaces are integrally molded in the single housing, so that the step of adjusting assembly tolerance of the sensitive optical component can be simplified, and individual and lot differences due to variations in the manufacturing of the optical path can be reduced. This allows for realization of a gas sensor that has high robustness and can detect gas concentration with higher accuracy.

Additionally, according to the gas cell housing 30 of the present embodiment, the problem of positional misalignment due to the mixing of different materials (thermal expansion coefficient, humidity expansion coefficient, and the like) is reduced. Therefore, for light that is input from the light emitter 21 to the mirror section 40, multiple reflected, and then received by the light receiver 22, most of the light multiple reflected by the mirror section 40 can be received with higher accuracy by the light receiving surface 22a of the light receiver 22.

In addition, according to the gas cell housing 30 of the present embodiment, the perimeter of the rectangular-parallelepiped gas cell housing 30 is integrally formed by four continuous walls. The opening portion 30k at the top is formed to be coincident with the pull-out direction Lu of the upper mold 100, and the top opening portion 30k is sealed from the upper surface by the particle filter 50, as well as the opening portion corresponding to the substrate mounting surface 31 formed at the bottom surface is formed to be coincident with the pull-out direction Ls of the lower mold 200, the opening portion corresponding to the substrate mounting surface 31 is sealed from the bottom surface by the substrate 20.

As a result, according to the gas cell housing 30 of the present embodiment, the gas sensor 10 having high robustness and capable of detecting gas concentration with higher accuracy can be obtained. Moreover, there can be manufactured the gas sensor 10 that has high ingress protection (IP rating) while reducing product cost by simplifying the design of the mold for molding the gas cell housing 30.

Furthermore, according to the present embodiment, because of the simplified assembly structure in which the mirror section 40 is integrally molded on the inner surface of the gas cell housing 30, fewer components are needed to assemble the gas sensor 10, and the assembly step therefor can also be simplified.

Particularly, according to the present embodiment, the pull-out directions Lu and Ls of the upper mold 100 and the lower mold 200, respectively, forming the upper and lower molds are parallel to each other. Therefore, the assembly of all of the components that form the gas sensor 10 can be efficiently performed from two directions along a single axis line being the insertion and pull-out directions of the upper and lower molds 100 and 200.

REFERENCE SIGNS LIST

- 10: Gas sensor
- 20: Substrate
- 21: Light emitter
- 21*a*: Light emitting surface
- 22: Light receiver
- 22*a*: Light receiving surface
- 30: Gas cell housing (housing section)
- 31: Substrate mounting surface
- 40: Mirror section
- 41 to 45: Reflector
- 50: Particle filter
- 100: Upper mold
- 200: Lower mold

The invention claimed is:

1. A gas cell housing molding mold for injection molding, with resin material, a gas cell housing comprising a mirror section including a plurality of reflectors arranged to multiple reflect light emitted from a light emitter and cause the light to enter a light receiver in an opposing direction of one side and an other side of a substrate mounting surface with respect to the substrate mounting surface mounted with a substrate including the light emitter and the light receiver, the gas cell housing molding mold being configured to integrally mold all of the plurality of reflectors on an inner surface of the single gas cell housing to be molded by setting mutual pull-out directions of a lower mold and an upper mold during mold release obliquely with respect to a direction perpendicular to an extension direction of the substrate mounting surface so that all of the plurality of reflectors have no undercut shape.

2. The gas cell housing molding mold according to claim 1, wherein the lower mold and the upper mold, respectively, have a protrusion portion, sliding contact surfaces of the mutual protrusion portions forming a shutoff surface, and the shutoff surface being parallel to the pull-out directions during mold release.

3. A method for manufacturing a gas cell housing, the method comprising using the gas cell housing molding mold according to claim 1 to mold by setting the mutual pull-out directions of the lower and upper molds during mold release obliquely with respect to the direction perpendicular to the extension direction of the substrate mounting surface so that all of the plurality of reflectors have no undercuts and by inserting and pulling out the lower and upper molds and integrally mold all of the plurality of reflectors on an inner surface of the single housing section to manufacture the gas cell housing.

4. A gas cell housing for a gas sensor comprising, in a single housing section, a substrate mounting surface mounted with a substrate including a light emitter and a light receiver and a mirror section including a plurality of reflectors, wherein in the housing section, all of the plurality of reflectors are integrally molded on an inner surface of the housing section to multiple reflect light emitted from the light emitter and cause the light to enter the light receiver in an opposing direction of one side and an other side in an extension direction of the substrate mounting surface.

5. The gas cell housing for a gas sensor according to claim 4, wherein the housing section has an opening portion on a side having the substrate mounting surface and another opening portion on a side facing the side having the substrate mounting surface, the opening portion on the side having the substrate mounting surface being formed on the substrate mounting surface, and the opening portion on the side facing the side having the substrate mounting surface being used as an inlet/outlet for a gas to be measured.

6. A gas sensor comprising the gas cell housing for a gas sensor according to claim 4.

\* \* \* \* \*